(12) United States Patent
Lindblad et al.

(10) Patent No.: US 6,396,195 B1
(45) Date of Patent: May 28, 2002

(54) ULTRASOUND HORN

(75) Inventors: Ulf Lindblad, Lund; Magnus Rabe, Akarp; Per Johansson, Malmo, all of (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 09/600,296

(22) PCT Filed: Dec. 22, 1998

(86) PCT No.: PCT/SE98/02422
§ 371 (c)(1),
(2), (4) Date: Jul. 14, 2000

(87) PCT Pub. No.: WO99/36249
PCT Pub. Date: Jul. 22, 1999

(30) Foreign Application Priority Data

Jan. 19, 1998 (SE) ............................................... 9800120

(51) Int. Cl.$^7$ ............................................. B29C 65/08
(52) U.S. Cl. ................................. 310/323.19; 310/325
(58) Field of Search .......................... 310/323.19, 325, 310/326, 337, 322, 334; 74/155

(56) References Cited

U.S. PATENT DOCUMENTS

| | | | |
|---|---|---|---|
| 3,438,824 A | 4/1969 | Balamuth | 264/445 |
| 3,590,288 A * | 6/1971 | Minchenko | 310/325 |
| 3,915,018 A * | 10/1975 | Karplus | 73/647 |
| 3,966,520 A | 6/1976 | Fallenbeck et al. | 206/530 |
| 4,063,990 A | 12/1977 | Volz et al. | 156/580.2 |
| 4,259,419 A | 3/1981 | Uba et al. | 429/174 |
| 4,281,763 A | 8/1981 | Pace | 206/530 |
| 4,858,264 A * | 8/1989 | Reinhart | 15/93.1 |
| 5,275,767 A | 1/1994 | Micciche | 264/445 |

FOREIGN PATENT DOCUMENTS

| | | |
|---|---|---|
| DE | 1 704 178 | 4/1974 |
| FR | 2 678 859 | 1/1993 |
| GB | 1 524 924 | 9/1978 |
| GB | 2 076 335 | 12/1981 |

* cited by examiner

Primary Examiner—Brian Sircus
Assistant Examiner—Michael C. Zarroli
(74) Attorney, Agent, or Firm—Burns, Doane, Swecker & Mathis, L.L.P.

(57) ABSTRACT

A rotation-symmetric ultrasound horn for producing a circular seal to effect liquid-tight joining together of, for example, packaging container parts. The ultrasound horn is connected to an ultrasound source which supplies the horn axially via a supply end. The horn displays an opposing, tubular working end with a circular work surface. The mean diameter of the tubular part varies along the axis of the horn so that the horn, in the region of the work surface, is of greater mean diameter and cross-sectional area than in a region located between the work surface and the supply end of the horn. As a result of this design and construction, the initially axial ultrasound waves are given a radial component of sufficient amplitude to achieve welding of thermoplastic material along the circular work surface of the horn.

20 Claims, 2 Drawing Sheets

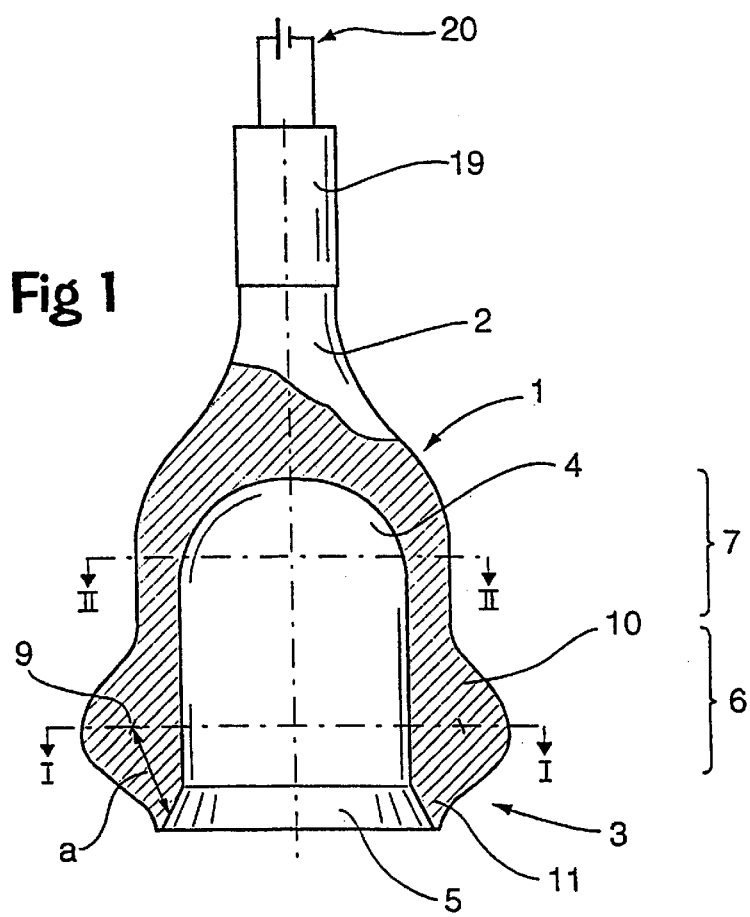
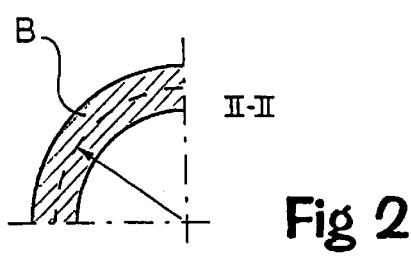
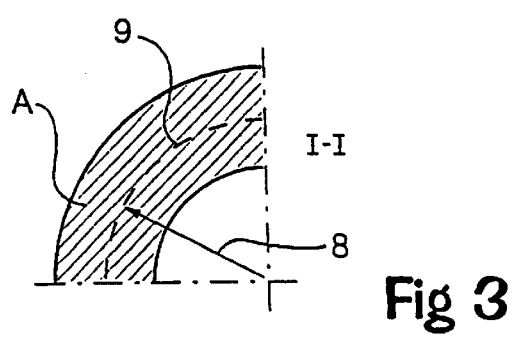

ULTRASOUND HORN

TECHNICAL FIELD

The present invention relates to an ultrasound horn of rotation-symmetric type, comprising a supply end which is connected to an ultrasound source, and a tubular working end which displays an endless work surface.

BACKGROUND ART

Ultrasound vibrations within the frequency range of 15–50 kHz are nowadays employed industrially for a number of purposes, inter alia welding of different material types. Welding of thermoplastic material is a common task within the packaging industry and, as a result, ultrasound welding finds an increasing number of fields of application in the manufacture of different types of packaging containers, not only of pure plastic film or plastic material but also of different types of laminates which include exterior layers of thermoplastic. Originally, the ultrasound technique was employed only for relatively simple, rectilinear welds of planar material, but continued progress and development have entailed that ultrasound welding is now also employed for advanced welding operations, e.g. different combinations of materials and different types of non-linear welds in a plurality of dimensions.

A typical assembly for ultrasound sealing of the type which is employed within the packaging industry utilizes an ultrasound source (drive unit or converter) for creating ultrasound at the desired frequency. The ultrasound source may be of conventional type and include, e.g. a piezoelectric crystal which is caused to oscillate by being connected to a suitable current source. Once the ultrasound source has thus brought about the conversion from electricity to mechanical, reciprocating motion, this oscillation is normally transferred by mechanical contact between the ultrasound source and an ultrasound horn at whose opposite end is located the actual work surface which is in contact with the material which is to be welded and sealed. The work surface of the ultrasound horn (or in any event its operative part) is normally more or less linear and may be, for example, straight, curved or circular. A feature common to the majority of prior art applications of ultrasound welding of thermoplastic packaging materials is that the work surface is located at a right angle to a centre line extending through the ultrasound source and the ultrasound horn. The transfer of the ultrasound vibrations from the ultrasound source to the ultrasound horn hereby takes place rectilinearly along the centre axis of the horn, which reduces losses and creates relatively few problems in connection with the design of the horn and its work surface, since only axial waves are transferred through the assembly. In prior art assemblies, there is also often provided a so-called booster located between the ultrasound source and the horn, the booster—because of its geometric design—amplifying the amplitude of the mechanical motion so that this is optimal for ultrasound welding of, for example, thermoplastic material.

In the manufacture of, for example, round, polygonal or conical packaging containers, it is desirable to realize a closed sealing line which extends around the circumference of the packaging container. This is, for example, necessary when a round packaging container is to be provided with end walls, or when the circumferential casing of a round packaging container is to be connected to a more or less conical container top. A closed seal along, for example, the circumference of a cylindrical packaging container may naturally be realized by means of an ultrasound horn with a short, straight work surface, provided that the sealing operation takes place in many stages during simultaneous rotation of the packaging container. However, this technique is time-consuming and not always realizes a satisfactory result, for which reason it is desirable to realize an ultrasound horn with an endless, for example, circular or hexagonal work surface. When round or conical packaging containers are to be provided with end walls or more or less conical tops, use is therefore preferably made of an ultrasound horn which has a circular work surface and thereby realizes a closed, annular weld in one single working phase. One example of this is shown in U.S. Pat. No. 3,438,824 which discloses the ultrasound sealing of an end wall to a container. In such instance, use is made of a horn which is rotation-symmetrical or annular apart from the anchorage portion, the horn being supplied radially from a conventional ultrasound source. This design and construction permit welding of surfaces which are substantially parallel with the longitudinal axis of the welded object, but provide no amplitude amplification, and the unit is relatively bulky and inflexible. For example, it is necessary to displace each individual packaging container which is to be welded to a work position in which the packaging container is in contact with the horn. This is a disadvantage in high output capacity machines where the packaging containers pass on a conveyor or a mandrel wheel and the sealing equipment must be moved between a retracted, inactive position and a protracted, active working position.

A construction displaying axial supply and thereby consequential possibilities of displacing the ultrasound assembly reciprocally between working and rest positions is disclosed in U.S. Pat. No. 4,063,990, which describes the use of an ultrasound horn for the fixed welding of opening arrangements onto packaging containers. Those surfaces which are to be welded together are, in this instance, located at a 90° angle to the longitudinal axis of the horn, which gives optimum conditions for the transfer and utilisation of the axial vibrations. If those surfaces which are to be welded together are instead located more or less parallel with the centre axis (in any event at an angle of less than 45° to the centre axis), the welding by means of axial vibrations will be ineffective, since, with the reducing angle, an increasingly large proportion of radial vibrations is required in order to achieve a satisfactory and practically usable welding effect.

It will thus be apparent from the foregoing that, particularly within the packaging industry, there is a need for an ultrasound horn which, despite axial supply, gives radial vibrations or oscillations of such amplitude that welding can take place along a circular or polygonal work surface which is located at a relatively slight angle to the centre axis of the horn.

There is thus a need in the art to realise an ultrasound horn which, without causing disruptive parasite oscillations and thereby losses in the form of heat and material stresses, converts axially supplied ultrasound oscillations into oscillations with a radial component which has sufficiently large amplitude to make for ultrasound welding in cylindrical or conical packaging container surfaces.

OBJECTS OF THE INVENTION

One object of the present invention is to realise an ultrasound horn of rotation-symmetrical type, the horn converting incoming, axial ultrasound oscillations into ultrasound oscillations with a radial component of such amplitude that ultrasound sealing becomes possible along an endless, circular or polygonal work surface whose angle to the centre axis of the ultrasound horn is equal to or less than 45°.

A further object of the present invention is to realise an ultrasound horn of the above-outlined type whose work surface is located such that axially projecting parts of the processed object do not come into contact with the horn.

Still a further object of the present invention is to realise an ultrasound horn of the above-outlined type which gives the desired conversion of axial oscillations into radial oscillations without the losses and thereby heating of the horn disrupting the work cycle.

Yet a further object of the present invention is to realise an ultrasound horn of the above-outlined type which displays a simple and reliable design and construction making for lengthy, continuous operation without the creation of harmful oscillations or crack formation.

Still a further object of the present invention is to realise an ultrasound horn which does not suffer from the drawbacks and weaknesses inherent in the above-mentioned prior are assemblies and which, therefore, may be employed for commercial operation in modern, high output capacity filling machines.

SUMMARY OF THE INVENTION

The above and other objects have been attained according to the present invention in that an ultrasound horn of the type disclosed by way of introduction has been given the characterizing features that the mean diameter of the tubular part varies along the axis of the horn, and that the tubular part has, at its end portion provided with the work surface, a first region of greater mean diameter and cross sectional area than a second region which is located at the end portion of the tubular part facing towards the supply end.

Preferred embodiments of the ultrasound horn according to the present invention have further been given the characterizing features as set forth in the appended subclaims.

By designing a rotation-symmetrical ultrasound horn according to the present invention with a tubular part which has greater mean diameter and cross sectional area at the work end than at the supply end, a conversion of axial oscillations into radial oscillations takes place along the periphery of the tubular part, this conversion being further amplified by a suitable selection of wall thickness and be selecting a mean circumference which, in the region at the work surface, is substantially equal to one wavelength.

BRIEF DESCRIPTION OF THE ACCOMPANYING DRAWINGS

One preferred embodiment of the ultrasound horn according to the present invention will now be described in greater detail hereinbelow, with particular reference to the accompanying, schematic Drawings which show only those parts and details indispensable to an understanding of the invention. In the accompanying Drawings:

FIG. 1 show, partly in section, an assembly with a first embodiment of an ultrasound horn according to the present invention;

FIG. 2 shows a cross section through a part (II—II) of the ultrasound horn according to FIG. 1;

FIG. 3 shows a cross section through another part (I—I) of the ultrasound horn according to FIG. 1;

DESCRIPTION OF PREFERRED EMBODIMENTS

Figure 4:
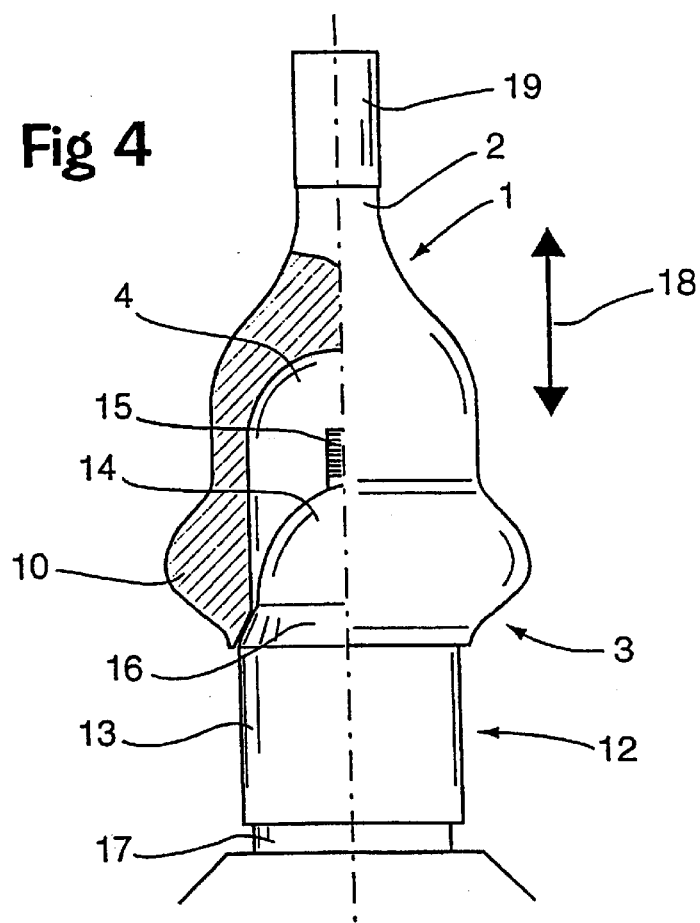
FIG. 4 shows, partly in section, how the ultrasound horn is employed for the sealing together of two parts of a packaging container.

In the preferred embodiments of the apparatus according to the present invention as illustrated in the Figures, use is made in all cases of an ultrasound horn 1 of rotation-symmetrical type, the horn being manufactured form a homogeneous material, preferably a metal such as aluminium or titanium. The horn has an upper supply end 2 and a lower working end 3 which displays an interior, likewise rotation-symmetrical recess 4. The recess 4 takes up substantially ⅔ of the total length of the horn. In the proximity of the working end 3 of the horn, there is disposed an endless (preferably circular) work surface which may be cylindrical, conical or divided into a large number of preferably planar segments so that it will have polygonal, e.g. hexagonal or octagonal configuration. The form of the work surface 5 may, in this manner, be adapted to the form of the objects which are to be processed by means of the ultrasound horn according to the invention. The work surface is thus at least partly located in the recess 4 displayed by the working end 3 of the horn, and turned to face towards the centre axis of the horn and disposed at an angle to the centre axis which, in the illustrated embodiments, amounts to approx. 20°, but in any event is less than 45°. In other types (not shown) of horns intended for interior sealing, the work surface may instead be placed on the outside of the horn.

As was mentioned previously, the lower part of the ultrasound horn 1 is tubular, which is realised by means of the recess 4. For the sake of clarity, the lower half of the tubular part of the ultrasound horn 1 has been designated a first region 6 which extends from the lower, free end of the horn substantially halfway up along the centre axis of the tubular part. Immediately bordering of this first region, there is a second region 7 which is defined upwardly by the close end of the recess 4. As will be particularly apparent from FIG. 1, the wall thickness of the tubular horn part varies along the longitudinal axis of the horn and the mean diameter 8 of the horn (which constitutes the means value of the exterior and interior diameters of the horn in a given transverse plane) thus also varies along the longitudinal axis of the horn. The mean diameter defines a mean circumference 9 (the mean value of the length of the interior and exterior circumference in a given axial position), which varies correspondingly along the longitudinal axis of the horn and, more precisely, increases on movement from the supply end 2 of the horn towards the working end 3 of the horn. This applies substantially also to the cross sectional area of the horn, for which reason this (A) is larger in a cross section I—I within the first region 6 than the cross sectional area (B) in a cross section II—II within the second region 7. The marked increase of the cross sectional area A compared with the cross sectional area B which is illustrated in FIGS. 2 and 3 is principally realised in that the ultrasound horn 1 includes, at its working end 3, an annular thickened portion or bead 10 which substantially extends exteriorly around the part of the horn located within the first region 6. In the preferred embodiment of the ultrasound horn 1 according to the invention as illustrated in FIG. 1, the work surface 5 is located immediately beneath the bead 10 or, ore precisely, at the lower, free end of an annular projection 11 which extends from the bead 10 and to the free end of the tubular part of the horn.

Figure 5:
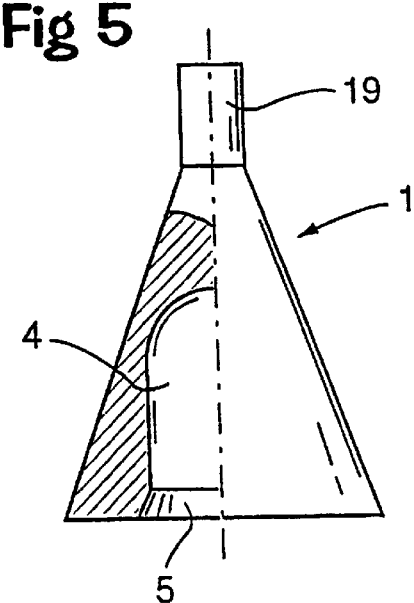
FIG. 5 shows, on a smaller scale and partly in section, a second embodiment of the ultrasound horn according to the present invention.
Figure 6:
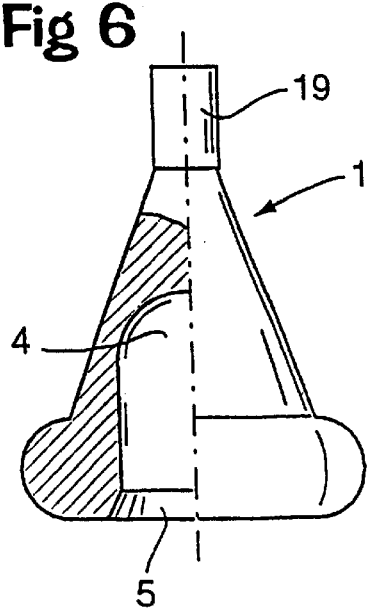
FIG. 6 shows, on a smaller scale and partly in section, a third embodiment of the ultrasound horn according to the present invention.

In the substantially bell-shaped embodiment of the ultrasound horn 1 which is illustrated in FIG. 1, the cross sectional area varies, as previously mentioned, along the axial length of the ultrasound horn 1 and, as a result, the wall thickness in the tubular part of the horn will also vary so that the wall thickness is generally larger within the first region 6 than within the second region 7 and, more precisely, progressively declines from the upper end of the tubular part to the transition between the first region 6 and the second region 7 where the wall thickness is least, in order thereafter once again to increase within the first region 6 where the bead 10 is located. However, one exception to this is the tubular projection 11 which supports the work surface 5. However, there is no counterpart to this projection 11 in the two embodiments of the ultrasound horn according to the present invention as illustrated in FIGS. 5 and 6. In these embodiments, the work surface 5 is instead placed more proximal adjacent the lower end of the horn, at which the cross sectional area is at its largest. The two embodiments according to FIGS. 5 and 6 also otherwise deviate geometrically from the embodiment of FIG. 1, and the embodiments of FIGS. 5 and 6 are rather to be considered as variations which have been adapted to specific working conditions and/or specific materials and material combinations. Thus, for example, the horn according to FIG. 5 is optimised given that it should be simple to manufacture and therefore displays a substantially conical outside and a cylindrical machining or recess 4. While this embodiment gives radial oscillations of sufficient amplitude to make for welding of, for example, packaging containers coated with thermoplastic material, a maximum amplitude amplification will not be achieved, since the difference between the mean diameter/cross sectional area at the lower end of the tubular horn part and at its upper end is relatively slight. The difference between these two both important parameters is even greater in FIG. 6, which, however, is more complicated and more expensive (being more material-consuming) to manufacture. However, the horn is superior to the horn type illustrated in FIG. 5 as regards realising radial oscillations of large amplitude, for which reason the more complicated and capital-intensive manufacture may, in certain cases, be compensated for in that the ultrasound source is made smaller and in that heat generation and mechanical stresses on the horn are reduced.

In order, in the conversion from axial to radial oscillations, to ensure maximum amplitude amplification, it is not only necessary that the mean diameter/cross sectional area is considerably greater at the first region 6 of the horn than at the second region 7 of the horn, but also that the horn, at its working end 3, has a mean circumference 9 which is equal to a complete wavelength. As a result, the oscillations at the working end 3 of the horn will be further amplified such that an optimum quantity of energy is converted into active, radial oscillations while parasite oscillations and consequential heat generation and stress on the material of the horn are reduced. The projection 11 shown in FIG. 1 will, in such instance, give a further fulcrum effect which, because of the distance a to the centre of the bead 10, gives an additional amplification of the oscillations within that region where the work surface is located.

As will be apparent from FIGS. 1, 4, 5 and 6, an ultrasound source 19 of per se known type is, in all embodiments, connected to the upper end or supply end 2 of the ultrasound horn 1. The ultrasound source 19 is preferably directly and mechanically connected to the supply end 2, but it is naturally also possible to utilise a booster disposed between the ultrasound source and the ultrasound horn, the booster amplifying, in a per se known manner, the amplitude of the oscillations in order to adapt them to the intended purpose, and possibly also to serve for suspending the assembly in a machine frame (not shown). Furthermore, the ultrasound source 19 is naturally connected in a per se known manner to a conventional current source 20, which is unlikely to need any further description in this context.

FIG. 4 shows the ultrasound horn according to FIG. 1 in use, i.e. on welding of a packaging container 12 which consists of a substantially cylindrical casing or container body 13 and a container top 14 which is provided with a projecting neck 15, e.g. provided with threading. The upper end of the container body 13 and the lower end of the container top 14 overlap within a circular portion which constitutes the sealing region 16 which is to be processed by the work surface 5 of the ultrasound horn 1. The container body 13 which, for example, may be manufactured from a laminated paper/plastic laminate, comprises outer layers of thermoplastic which are to be bonded to fused in liquid-tight fashion to the top 14, for example manufactured of thermoplastic. The recess 4 in the ultrasound horn 1 must, as is apparent from FIG. 4, be of such size that it can accommodate the entire top 14 together with projecting neck 15 and possible opening arrangement, without any mechanical hindrance. This is made possible with the aid of the horn design and construction according to the present invention.

When the embodiment of the ultrasound horn according to the present invention illustrated in FIGS. 1 and 4 is utilised for welding of, for example, packaging containers, the horn is, together with the ultrasound source 19 and associated equipment, placed in a filling machine (not shown) and movably connected to the frame of the machine so that, in accordance with the arrow 18 (FIG. 4), it may be displaced between a forward, active position which is illustrated in FIG. 4 and a rear, inactive position.

It will further be apparent from FIG. 4 how the packaging container 12 is supported by a wheel provided with mandrels 17, or other transport device which, in a per se known manner, is displaceable stepwise for bringing the packaging container 12 to the correct position under the ultrasound horn 1, i.e. in a position in which the centre axis of the ultrasound horn 1 coincides with the centre axis of the mandrel 17 (and of the packaging container 12). When the ultrasound horn 1 is located in its active position, its work surface 5 is in abutment against the sealing region 16 on the packaging container. In the inactive position, the lower end of the ultrasound horn 1 is located such a distance from the mandrel 17 that the packaging container, with container top and possibly neck 15 or opening arrangement welded in place, may freely be displaced further with the aid of the mandrel wheel, without coming into contact with the lower end of the horn 1. The displacement of the horn assembly between the forward and rear positions takes place with the aid of conventional means (not shown) such as hydraulic, pneumatic or cam-steered devices.

While the ultrasound horn 1 is located in its rear, inactive position, a container body 13 together with associated container top 14 is moved to the correct working position, i.e. the position illustrated in FIG. 4 in which the centre axes of the container body 13, the container top 14 and the ultrasound horn 1 all coincide. The advancement of the packaging containers may take place stepwise with the aid of the mandrel wheel, which, as was mentioned previously, displays a mandrel 17 placed in each container body 13, the mandrel having a conical abutment surface for cooperation with the work surface 5 of the ultrasound horn 1. Of course, the mandrel may also be supported by some other, per se known construction. The selection of machine design and construction is governed by other factors such as capacity, package type etc., and is not likely to be of critical importance in this context.

Once the packaging container body 13 with the container top 14 has been placed in the correct working position with the upper, conical end portion of the container body 13 in contact with the lower edge region of the container top 14 (i.e. those parts of the container body 13 and container top 14, respectively, which together form the sealing region 16), the ultrasound horn with the associated ultrasound source is displaced downwards according to the arrow 18 until such time as the work surface 5 of the ultrasound horn comes into abutment against the sealing region 16, more precisely the upper edge region of the container body 13. In this instance, the upper edge region of the container body 13 will press the lower portion of the container top 14 against the conical counter surface (not visible) of the mandrel 17 located interiorly in the packaging container body 13 until the desired abutment pressure has been reached. In this position, the ultrasound source 19 is activated by communication being established with the current source 20, whereupon the ultrasound source will generate axial ultrasound vibrations within a predetermined frequency range, e.g. 20 kHz. The ultrasound vibrations are predominantly axial, i.e. they follow the centre axis of the ultrasound source 19 and are transferred via the contact interface between the ultrasound source and the ultrasound horn to the supply end 2 of the ultrasound horn. As long as the ultrasound waves follow the centre axis of the horn 1 substantially rectilinearly, they are propagated as axial waves without amplitude amplification or other conversion (apart from certain losses). When, however, the waves reach the tubular part of the horn they are forced, because of the flaring of the horn, outwards from the centre axis, whereupon a transverse (radial) wave component arises under a certain energy loss (heat generation), which becomes larger with increasing mean diameter (mean circumference). It is clearly apparent from the cross section through the preferred embodiment of the ultrasound horn according to FIG. 1 how the original axial waves, in order to be able to be propagated down through the tubular part of the ultrasound horn, are forced to "expand out annularly", i.e. be progressively converted into radial wave motion. The progressive increase of the mean diameter 8 of the ultrasound horn within the second region 7 of the tubular part creates, however, no radial component powerful enough so as to be capable of ultrasound sealing or welding. However, at the transition between the second region 7 of the tubular horn part to the first region 6 thereof, a relatively powerful increase in the mean diameter 8 of the horn takes place, which forces the wave motion to become predominantly radial. When the saves reach the bead 10, because of the mass inertia, the bead will be forced into an oscillation movement around the mean circumference, which gives an amplification of the radial component of the wave motion. Since the mean circumference 9 flush with the central portion of the bead 10 has been selected to be a complete wavelength, this part of the horn will come into resonance, which greatly amplifies the radial component of the vibrations so that this will have an amplitude which is sufficient to realise, at the work surface 5, an ultrasound welding by heating the packaging container parts which are clamped in between the work surface 5 and the counter surface of the abutment and which partly consist of thermoplastic material, until such time as the thermoplastic material melts and fuses together. Because of the placing of the work surface 5 furthest down on the annular projection 11 extending downwards from the bead 10, the fulcrum a gives a certain transmission which further amplifies the amplitude flush with the work surface 5. After completed welding, the ultrasound source 19 is once again de-activated, whereafter the ultrasound horn 1, together with the ultrasound source, is lifted to its inactive position in which the packaging container 12 placed on the mandrel 17 may be freely transported further and a new packaging container may be moved to the working position beneath the ultrasound horn 1.

In the illustrated embodiment, which is suitable for welding packaging containers 12 of, for example, ½ liter volume, the recess 4 is approx. 100 mm deep, which provides ample room for the container top 14 of the packaging container and possibly the neck 15. As will have been apparent from the foregoing description, in addition to a progressive conversion form axial waves to radial waves, there also takes place an amplitude amplification which, with the illustrated design of the ultrasound horn, amounts to approx. 4.0 (9 $\mu$m input amplitude gives approx, 35 $\mu$m output amplitude, measured at right angles to the work surface 5).

Compared with an elongate body, e.g. a cylindrical metal rod, connected to a corresponding ultrasound source, the bell-shaped horn type according to the present invention not only realises a conversion of axial, ingoing ultrasound vibrations into radial vibrations, but also a powerful amplification of the amplitude of the vibrations. This is achieved partly by varying the mean diameter 8 of the tubular horn part along the axis of the horn, which gives the conversion from axial to radial wave motion, and partly in that the first region 6 at which the work surface 5 is located is of considerably greater mean diameter and cross sectional area than the corresponding dimensions of the second region 7. There will hereby be achieved a mass concentration at the lower end of the tubular part, the mass being located at greater mean circumference than the mass in the second region 7, and thereby to an increased extent being obliged to vibrate with radial wave propagation. The adaptation of the lower end of the horn so that, flush with the bead 10, it has a mean circumference which is equal to a complete wavelength is also of major importance to the amplitude amplification.

The embodiments of the ultrasound horn 1 according to the present invention as illustrated in FIGS. 5 and 6 function in a similar manner, the extra amplitude amplification which is achieved in the first-mentioned embodiment with the aid of the projection 11 being, however, absent in these two horn types.

The present invention should not be considered as restricted to that described above and shown on the Drawings, many modifications being conceivable without departing from the scope of the appended claims.

What is claimed is:

1. An ultrasound horn of rotation-symmetric type having an axis for sealing together packaging container parts, comprising:

a supply end connected to an ultrasound source;

a tubular part providing a working end displaying a continuous work surface for abutting a sealing region of the packaging container parts;

the tubular part having a mean diameter which varies along the axis of the horn;

the tubular part having, at an end portion provided with the work surface, a first region of greater mean diameter and wall-thickness than a second region which is located at an end portion of the tubular part located towards the supply end; and the work surface facing towards the axis of the horn.

2. An ultrasound horn of rotation-symmetric type having an axis, comprising:
- a supply end connected to an ultrasound source;
- a tubular part providing a working end displaying a continuous work surface;
- the tubular part having a mean diameter which varies along the axis of the horn;
- the tubular part having, at an end portion provided with the work surface, a first region of greater mean diameter and cross sectional area than a second region which is located at an end portion of the tubular part located towards the supply end;
- the first region of the tubular part being of greater wall thickness than the second region.

3. The ultrasound horn as claimed in claim 1, wherein the first region includes an annular bead.

4. The ultrasound horn as claimed in claim 2, wherein the horn is bell-shaped.

5. The ultrasound horn as claimed in claim 2, wherein the first region of the tubular part is of greater wall thickness than the second region.

6. The ultrasound horn as claimed in claim 2 wherein the work surface is disposed at a <45° angle to the axis of the horn.

7. The ultrasound horn as claimed in claim 2, wherein the work surface is located within the first region of the tubular part.

8. The ultrasound horn as claimed in claim 1, wherein the work surface is located immediately adjacent a free end of the tubular part.

9. The ultrasound horn as claimed in claim 2, wherein the mean diameter increases in a direction from the supply end of the tubular part towards the working end.

10. The ultrasound horn as claimed in claim 2, wherein the first region possesses a mean circumference that is substantially equal to one whole wavelength.

11. An ultrasound horn of rotation-symmetric type having an axis, comprising:
- a supply end connected to an ultrasound source;
- a tubular part providing a working end displaying a continuous work surface;
- the tubular part having a mean diameter which varies along the axis of the horn;
- the tubular part having, at an end portion provided with the work surface, a first region of greater mean diameter and cross sectional area than a second region which is located at an end portion of the tubular part located towards the supply end;
- the first region including an annular bead; and
- the work surface being located flush with the bead.

12. An ultrasound horn of rotation-symmetric type having an axis, comprising:
- a supply end connected to an ultrasound source;
- a tubular part providing a working end displaying a continuous work surface;
- the tubular part having a mean diameter which varies along the axis of the horn;
- the tubular part having, at an end portion provided with the work surface, a first region of greater mean diameter and cross sectional area than a second region which is located at an end portion of the tubular part located towards the supply end;
- the first region including an annular bead; and
- the work surface being located at a free end of an annular projection which extends from the bead to a free end of the tubular part.

13. The ultrasound horn as claimed in claim 12, wherein the horn consists of homogeneous, metallic material.

14. The ultrasound horn as claimed in claim 13, wherein the metallic material is aluminium.

15. The ultrasound horn as claimed in claim 13, wherein the metallic material is titanium.

16. The ultrasound horn as claimed in claim 12, wherein the work surface is circular.

17. The ultrasound horn as claimed in claim 12, wherein the work surface is polygonal.

18. The ultrasound horn as claimed in claim 1, wherein the work surface is disposed at a <45° angle to the axis of the horn.

19. The ultrasound horn as claimed in claim 1, wherein the work surface is located within the first region of the tubular part.

20. The ultrasound horn as claimed in claim 1, wherein the first region possesses a mean circumference that is substantially equal to one whole wavelength.

* * * * *